United States Patent
Debates et al.

(10) Patent No.: US 9,613,307 B1
(45) Date of Patent: Apr. 4, 2017

(54) RADIO FREQUENCY IDENTIFICATION OPERATIONAL CAPABILITY REMOVAL

(71) Applicant: Motorola Mobility LLC, Chicago, IL (US)

(72) Inventors: Scott Debates, Crystal Lake, IL (US); Hong Zhao, Naperville, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 14/946,869

(22) Filed: Nov. 20, 2015

(51) Int. Cl.
*G06K 19/06* (2006.01)
*G06K 19/077* (2006.01)

(52) U.S. Cl.
CPC .............................. *G06K 19/07775* (2013.01)

(58) Field of Classification Search
CPC  G06K 19/06; G06K 5/00; G06K 7/06; G06K 19/00; G06F 17/00
USPC .......................... 235/492, 380, 375, 493, 487
See application file for complete search history.

(56) References Cited

U.S. PATENT DOCUMENTS

| | | | | |
|---|---|---|---|---|
| 7,232,069 B1* | 6/2007 | White | ................ | G06K 7/10326 235/380 |
| 2005/0134435 A1* | 6/2005 | Koyama | ............ | G06K 19/0723 340/10.34 |
| 2006/0208901 A1* | 9/2006 | Kai | ................ | G06K 19/07749 340/572.7 |
| 2011/0084146 A1* | 4/2011 | Owada | ............ | G06K 19/07784 235/492 |
| 2012/0205452 A1* | 8/2012 | Rofougaran | ....... | G06K 7/10237 235/492 |
| 2014/0070010 A1* | 3/2014 | Diorio | ............. | G06K 19/07773 235/492 |

* cited by examiner

*Primary Examiner* — Edwyn Labaze (57) ABSTRACT

In certain embodiments of radio frequency identification (RFID) operational capability removal, different stages of a life cycle of an RFID integrated circuit (IC) are supported. In one stage, an RFID IC is coupled to an RFID antenna and uses the RFID antenna to communicate wirelessly. In another stage, an operational capability of the RFID IC is removed by coupling a component thereto. For example, a circuit board includes an RFID IC and an RFID antenna operably coupled thereto. During a manufacturing stage of a device, the RFID IC can communicate using the RFID antenna. As part of the device assembly, a device component is mated to the circuit board. Respective electrical connection parts of the circuit board and of the device component are coupled together as part of a mating procedure. The coupling removes an operational capability of the RFID IC, such as a capability to use the RFID antenna.

20 Claims, 9 Drawing Sheets

RADIO FREQUENCY IDENTIFICATION OPERATIONAL CAPABILITY REMOVAL

BACKGROUND

The acronym RFID is taken from the term "Radio-Frequency Identification." With RFID, an integrated circuit and an antenna are typically combined into a small electronic tag that may be programmed with identifying data or other information. In one example usage scenario, an inventory product code such as a stock-keeping unit (SKU) may be stored by an RFID tag to track inventory in a warehouse or to facilitate customer check-out in a store. An RIFD tag is capable of bidirectional wireless communication using the antenna and a radio frequency (RF) channel for information programming and recall. Hence, information programming of the RFID tag may be effectuated wirelessly by transmitting information to the integrated circuit via the antenna. The information may also be subsequently recalled from the RFID tag using a wireless mechanism.

An RFID reader can be used to communicate wirelessly with an RFID tag. In an example operation, the RFID reader transmits an interrogation signal to the RFID tag and receives a response signal back. At the RFID tag, the received interrogation signal is interpreted as a command to send back the response signal, along with any requested information that the integrated circuit is storing. This exchange of signals between an RFID reader and an RFID tag may be initiated, intentionally or unintentionally, by the RFID reader whenever the RFID reader transmits an interrogation signal in range of the RFID tag. Once a conventional RFID tag is constructed, the conventional RFID tag continues processing and responding to interrogation signals indefinitely.

BRIEF DESCRIPTION OF THE DRAWINGS

Embodiments of radio frequency identification (RFID) operational capability removal are described with reference to the following FIGS. The same numbers may be used throughout to reference like features or components that are shown in the FIGS..

DETAILED DESCRIPTION

After a radio frequency identification (RFID) tag is constructed by connecting an integrated circuit to an antenna, the RFID tag is capable of receiving, processing, and responding to interrogation signals. With a conventional RFID tag, this functional capability continues indefinitely. In other words, if the conventional RFID tag receives an interrogation signal, the conventional RFID tag responds to the interrogation signal in the same functional manner on an ongoing basis. Although this provides a measure of predictability for RFID technology, the cost of this predictability is reduced flexibility. For example, it is difficult to adapt conventional RFID technology for usage across different stages of an RFID tag's life cycle.

One example environment in which a life cycle of an RFID tag may undergo different stages is with embedded use. For instance, an RFID tag may be incorporated into a circuit board and embedded in an electronic device, such as a smart phone. In a first stage of the life cycle of the RFID tag, an integrated circuit and an antenna of the RFID tag are incorporated into a circuit board that includes other circuit devices. The RFID tag is used during manufacturing to track the circuit board, perform testing, manage storage of device-identifying information, and so forth. The RFID tag may continue to be used for such purposes during an assembly process. As part of the assembly process for the electronic device, a chassis, such as a housing or a frame, is included as part of the electronic device to support or enclose the device internals, including the circuit board and the RFID tag thereof.

In a second stage of the life cycle of the RFID tag, the electronic device may leave the manufacturing environment to be sold to an end user and utilized on a daily basis. Unfortunately, the housing that surrounds the RFID tag can significantly interfere with wireless signals with regard to an antenna that is internal to the housing. Because the antenna of the RFID tag is relatively small and the housing attenuates incoming and outgoing electromagnetic radiation, the RFID tag has a reduced viable range or may even be substantially unreadable. Consequently, the RFID tag may be unreliable or useless to the end user.

In other circumstances for the second stage of the life cycle of the RFID tag, a manufacturer of the electronic device may wish to prevent an end user from accessing information that is stored on an integrated circuit of the RFID tag, such as manufacturing information that is proprietary. Additionally, a manufacturer may want to provide an electronic device with different RFID capabilities, such as having a stronger wireless signaling capability or executing different applications than the ones used during manufacturing. Unfortunately, conventional RFID technology does not provide a mechanism to automatically deactivate an RFID tag or some functionality thereof.

Thus, there are a number of problems with conventional RFID technology in the context of using RFID tags on circuit boards of electronic devices. First, a conventional RFID tag included as part of a circuit board may be unintentionally rendered actually or effectively useless after the manufacturing process is complete due to wireless interference from a housing or another signal-attenuating component of the electronic device. Second, an RFID tag may continue to possess proprietary information that a manufacturer would prefer to keep private. Third, an original equipment manufacturer may want to change RFID-related application functionality from those that support manufacturing and inventory tracking to those that support user applications.

In contrast with conventional RFID technology, an RFID system is described in which an operational capability of an RFID integrated circuit can be altered, including during the life cycle of the RFID integrated circuit. In one or more embodiments, an operational capability of an RFID integrated circuit, which is part of a circuit board of an electronic device, is removed using an electromechanical mechanism. During the manufacturing of the electronic device, a device component is included along with the circuit board within a housing of the electronic device. The inclusion of the device component removes an operational capability of the RFID integrated circuit that is part of the circuit board of the electronic device. Examples of operational capabilities of an RFID integrated circuit include: being capable of using a particular RFID antenna that is coupled to the integrated circuit, being capable of receiving or processing a wireless interrogation signal, being capable of wirelessly sending out a response signal, being capable of performing processing generally, being capable of interacting with another processor of the circuit board, or some combination thereof.

An example embodiment is described in which a capability to use an RFID antenna is removed. A circuit board for an electronic device, e.g. a main or primary circuit board, includes an applications processor, multiple radios, a video processor, and other circuit devices. The circuit board also includes an RFID integrated circuit and an RFID antenna, with the RFID integrated circuit coupled to the RFID antenna. During manufacturing, the RFID integrated circuit and the RFID antenna can be used as an RFID tag to track the progress of building the electronic device. As part of the manufacturing process, a device component is applied to the circuit board. The device component may be implemented, for instance, as an antenna assembly having a set of antennas for the multiple radios of the circuit board. The device component can be applied to the circuit board by mating one to the other, by securing each to the other, by combining the two together within a chassis of the electronic device, some combination thereof, and so forth.

By applying the device component to the circuit board, the RFID integrated circuit is prevented from using the RFID antenna, which removes this operational capability. The device component can, for example, ground out the RFID antenna of the circuit board to prevent the RFID antenna from being energized. Application of the device component may also add an operational capability. For example, the device component may include a larger RFID antenna that is coupled to the RFID integrated circuit to enable the RFID integrated circuit to transceive signals through a chassis of the electronic device after assembly is completed.

Although features and concepts of RFID operational capability removal can be implemented with any number of different apparatuses, systems, processes, environments, and/or configurations, embodiments of RFID operational capability removal are described in the context of the following example devices, components, apparatuses, systems, and methods.

Figure 1:
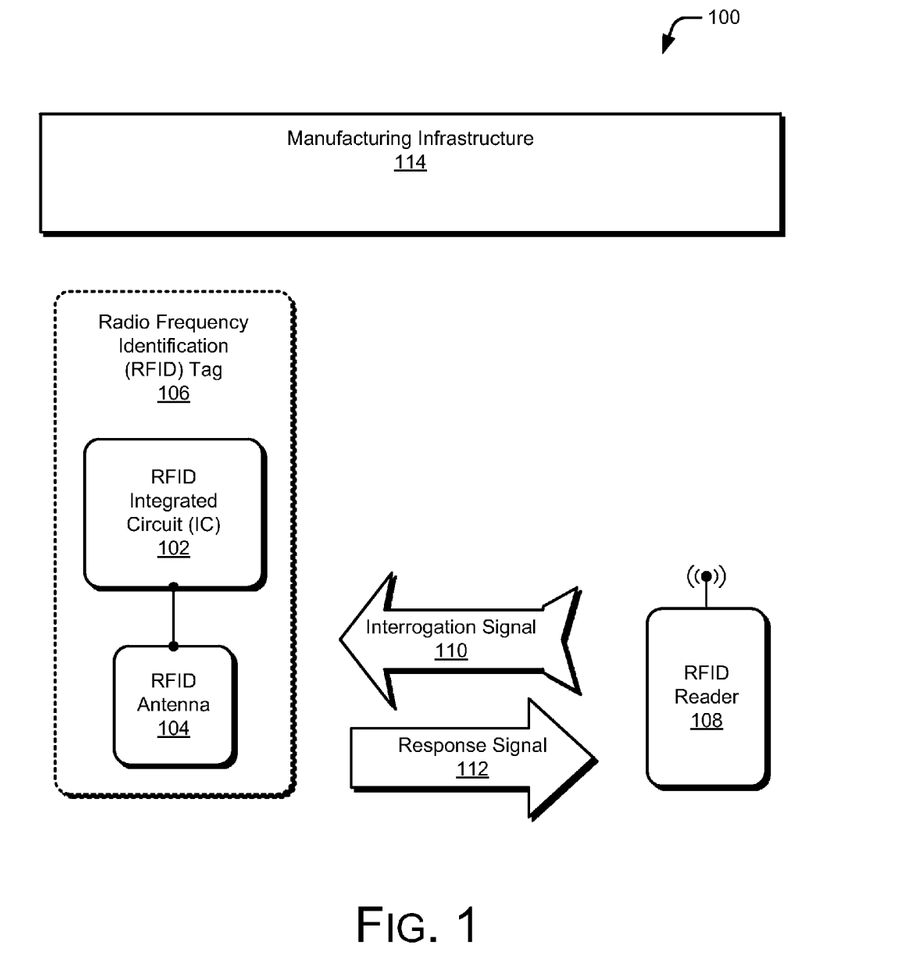
FIG. 1 illustrates an example environment including an RFID scenario in which embodiments of RFID operational capability removal can be implemented.

FIG. 1 illustrates an example environment 100 including a radio frequency identification (RFID) scenario in which embodiments of RFID operational capability removal can be implemented. The RFID environment 100 is a logical or block diagram of an example RFID system that is operational in conjunction with a manufacturing infrastructure 114. As illustrated, the example RFID environment 100 includes an RFID integrated circuit (IC) 102, an RFID antenna 104, and an RFID reader 108. The RFID scenario may include an exchange of RFID-related signals, including an interrogation signal 110 or a response signal 112.

In one or more embodiments, the RFID scenario may occur in a manufacturing context having manufacturing infrastructure 114. Examples of the manufacturing infrastructure 114 include fabrication areas, assembly lines, testing and diagnostic tools, inventory tracking equipment, warehouse machines, or some combination thereof that are part of a factory, warehouse, or manufacturing building. The RFID integrated circuit 102 and the RFID antenna 104, together with any RFID substrate (not shown in FIG. 1), may jointly be considered an RFID tag 106. Examples of an antenna and an integrated circuit of an RFID tag are described herein with reference to FIG. 8. The RFID reader 108 may be an independent electronic device or a component of another electronic device. Examples of electronic devices that may include an RFID reader 108 are an RFID reader gun, a mobile phone, a smart watch, a notebook computer, retail security scanning hardware, a medical monitoring unit, inventory tracking hardware (e.g., for manufacturing, warehouse, or retail purposes), manufacturing testing equipment, or some combination thereof.

In an example operation, the RFID reader 108 wirelessly transmits an interrogation signal 110 to one or more in-range RFID tags, such as the RFID tag 106. The RFID tag 106 receives the interrogation signal 110, which effectively requests that the RFID integrated circuit 102 provide information wirelessly. A request (not separately shown) of the interrogation signal 110 may specify particular information that is desired or may be asking for information generally. In response to receipt of the interrogation signal 110, the RFID integrated circuit 102 formulates the response signal 112, and the RFID integrated circuit 102 causes the formulated response signal 112 to be emanated or otherwise wirelessly sent via the RFID antenna 104.

Hence, the RFID tag 106 provides the response signal 112 via a wireless communication that is sent over an air interface. The response signal 112 may be produced by the RFID tag 106 as a version of the received interrogation signal 110. More specifically, the response signal 112 may be generated as a modulated radio frequency (RF) backscatter off of the RFID antenna 104 of the RFID tag 106 or as a reflected encoded version of the received interrogation signal 110. Additionally or alternatively, if the RFID tag 106 is powered independently of a contemporaneous energization by an interrogation signal 110, the response signal 112 may be transmitted using transmitter circuitry of such a powered RFID tag.

The RFID reader 108 wirelessly receives the response signal 112 from the RFID antenna 104 and the RFID integrated circuit 102 of the RFID tag 106. The response signal 112 may include one or more pieces of information that the RFID tag 106 is storing, has obtained, is producing, etc. using, e.g., the RFID integrated circuit 102. Examples of information that can be included in a response signal 112 are: an identification indicator such as a code or an alphanumeric value, a parameter derived from a sensor including a sensor value, a parameter derived from a timer including a time value, an indication descriptive of an associated device, inventory tracking information, an origin or source indicator—such as a serial and lot number, a mapping or geospatial coordinate, factory information, a diagnostic result, or some combination thereof.

Generally, RFID systems may be realized using at least low frequency (LF), high frequency (HF), or ultra-high frequency (UHF) radio waves. RFID systems may be passive or active. With active systems, RFID tags may include or otherwise have access to an independent power source, such as a battery. With passive systems, RFID tags harvest energy from an interrogation signal to become sufficiently energized so as to enable the RFID tags to reflect back a response signal. Harvested energy, which can also be collected from environmental forces such as motion or light, may be sufficient to also power an integrated circuit of an RFID tag to enable the integrated circuit to store received data or perform some amount of processing or sensing. Although not explicitly shown in the associated drawing figures, an RFID tag may include a capacitor or a small battery to temporarily collect and retain some of the energy harvested, e.g., from an interrogation signal to power integrated circuit processing or the sending of a response signal.

Alternative or hybrid RFID systems may also be implemented. Examples of other RFID systems include: a passive reader active tag (PRAT) system that has a passive reader which receives radio signals from active tags (e.g., battery operated transmit only tags), an active reader passive tag (ARPT) system that has an active reader which transmits interrogation signals and also receives response signals from passive tags, an active reader active tag (ARAT) system that uses active tags awoken or prompted by an interrogation signal sent from an active reader, a powered but passive tag system that has a powered passive tag (e.g., a battery-assisted passive (BAP) tag) that uses stored charge in a battery or capacitor to power continuous or repeated sensor readings and processing but awaits receipt of an interrogation signal before providing sensed values, or some combination thereof.

Figure 2:
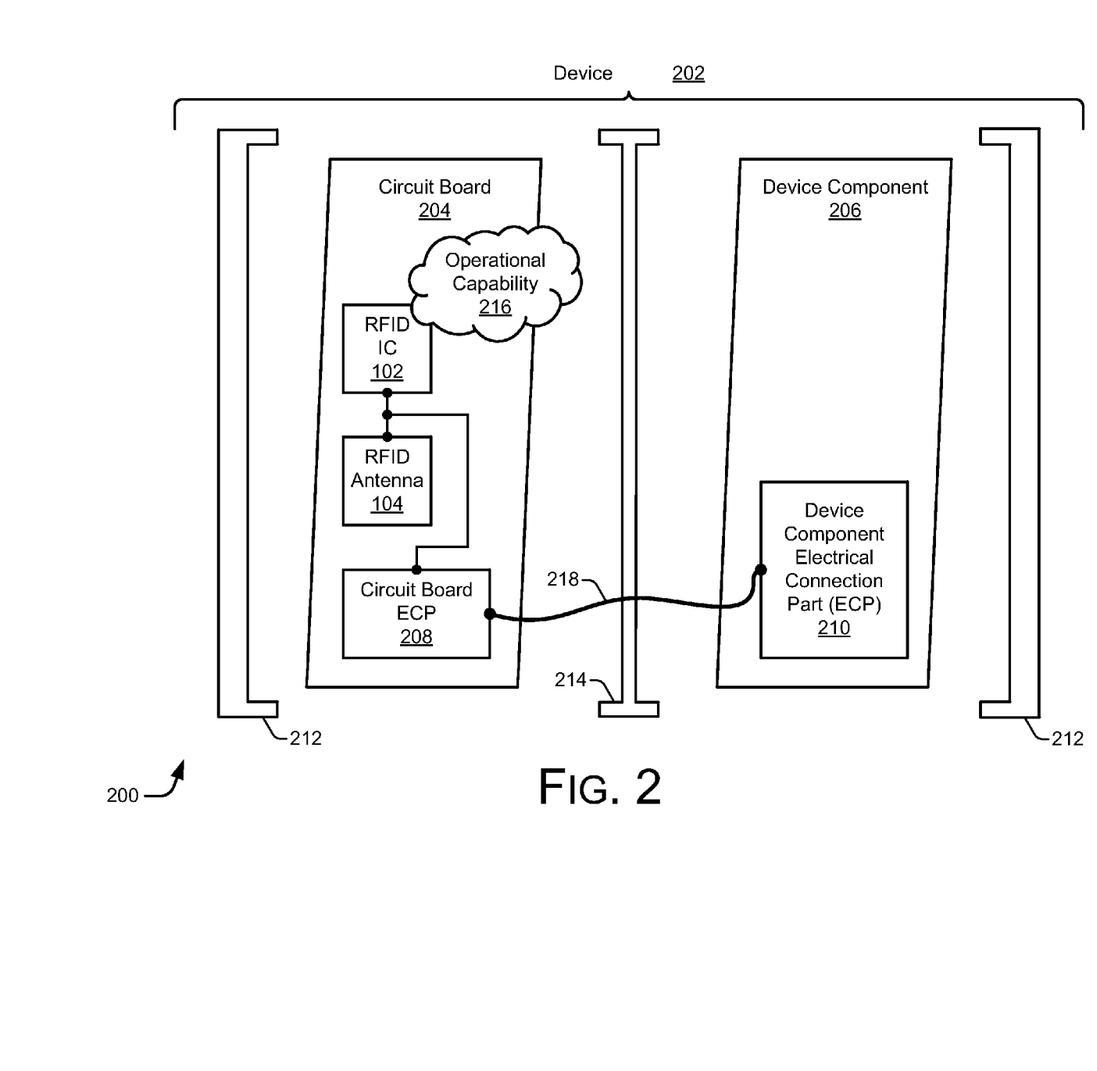
FIG. 2 illustrates an expanded view of a device having a circuit board and a device component with which embodiments of RFID operational capability removal can be implemented.

FIG. 2 illustrates an expanded view 200 of a device 202 having a circuit board 204 and a device component 206 with which embodiments of RFID operational capability removal can be implemented. The device 202 includes a chassis that encases or supports the various parts of the device 202. In the illustrated example, the chassis includes first and second portions of a housing 212, such as a front and a back of a device housing. The chassis further includes at least one frame 214, such as an internal metal structure or an external side of a housing.

The circuit board 204 includes at least an RFID integrated circuit 102 and an RFID antenna 104. The RFID integrated circuit 102 is operably coupled to the RFID antenna 104 such that the RFID integrated circuit 102 can use the RFID antenna 104 for wireless communication, like an RFID tag. The circuit board 204 further includes at least one circuit board electrical connection part (ECP) 208. The circuit board ECP 208 facilitates a connection with the device component 206. Electrical connection parts are described below with reference to the device component 206. The circuit board ECP 208 is coupled to the RFID integrated circuit 102 or to the RFID antenna 104. An example of a circuit board 204 is described below with reference to FIG. 3.

The RFID integrated circuit 102 includes or is associated with at least one operational capability 216. As described further below, an operational capability 216 can be removed from the RFID integrated circuit 102 by applying the device component 206 to the circuit board 204. An operational capability 216 may be removed by deactivating, taking away, eliminating, disabling, turning off, taking out, a combination thereof, etc. an ability to perform the corresponding operation.

An operational capability 216 can be intrinsic or extrinsic to the RFID integrated circuit 102. An intrinsic operational capability 216 is a capability that the RFID integrated circuit 102 can perform internally or alone, such as manipulating data. Examples of intrinsic operational capabilities 216 include a capability to process a received wireless signal, a capability to engage in I/O operations—such as with another processor or an external memory, a capability to execute instructions, a capability to formulate a wireless communication, or some combination thereof. An extrinsic operational capability 216 is a capability that the RFID integrated circuit 102 performs externally or jointly with another part, such as with the RFID antenna 104 or with another processor (not shown in FIG. 2). An example of an extrinsic operational capability 216, at least with respect to an antenna, is a capability to receive or transmit a wireless signal via the antenna. An example of an extrinsic operational capability 216, at least with respect to an application processor, is a capability to display some data that is stored by the RFID integrated circuit 102.

The device component 206 can be formed from a flexible plastic material, an inflexible plastic material, a printed circuit board (PCB) material, a composite material, some combination thereof, and so forth. The device component 206 can be implemented to include one or more parts usable by the device 202, such as at least one antenna, at least one battery, at least one circuit device, at least one screen, one or more keys or other buttons, some combination thereof, and so forth. The device component 206 includes at least one device component ECP 210. Examples of an electrical connection part (ECP) include a metal contact, a trace, a wire pattern, a switch, a clip, a snap or click connector, a screw, a pad, a friction connector, a conductive area, or some combination thereof. The connection fastening may be accomplished at least partially using soldering, threads, friction, a spring force, a combination thereof, and so forth. An example implementation of a device component ECP 210 is described below with reference to FIG. 4.

In one or more embodiments, circuit board 204 is applied to the device component 206 as part of a manufacturing process for the device 202. The device component 206 can be applied to the circuit board 204 by mating one to the other, by securing each to the other, by combining the two together within a chassis of a device, a combination thereof, and so forth. Mating the circuit board 204 to the device component 206 may be accomplished, for example, by operatively fitting the circuit board 204 and the device component 206 together within a housing 212 of the device 202. To effectuate the mating, the circuit board 204 is coupled to the device component 206 using the circuit board ECP 208 and the device component ECP 210 via at least one coupling 218. The coupling 218 may be established using the connector fastening (e.g., screw, soldering, or spring) for the selected type of electrical connection part. An example of a mating between a circuit board 204 and a device component 206 is described below with reference to FIG. 5.

In the expanded view 200, the circuit board 204 and the device component 206 are both shown as being rectangular. Additionally, the circuit board 204 and the device component 206 are both shown as having dimensions that are substantially co-extensive with the housing 212 of the device 202. However, these shapes and dimensions are presented by way of example only. The circuit board 204 or the device component 206 may be implemented instead, for instance, in one or more alternative shapes, including ones with curved edges. The circuit board 204 or the device component 206 may further be smaller than either of the dimensions of the housing 212. Moreover, the circuit board 204 and the device component 206 may be implemented in a shape or a size that differ from each other. Alternative form factors for the circuit board 204 and the device component 206 are shown in FIGS. 3-5.

Figure 3:
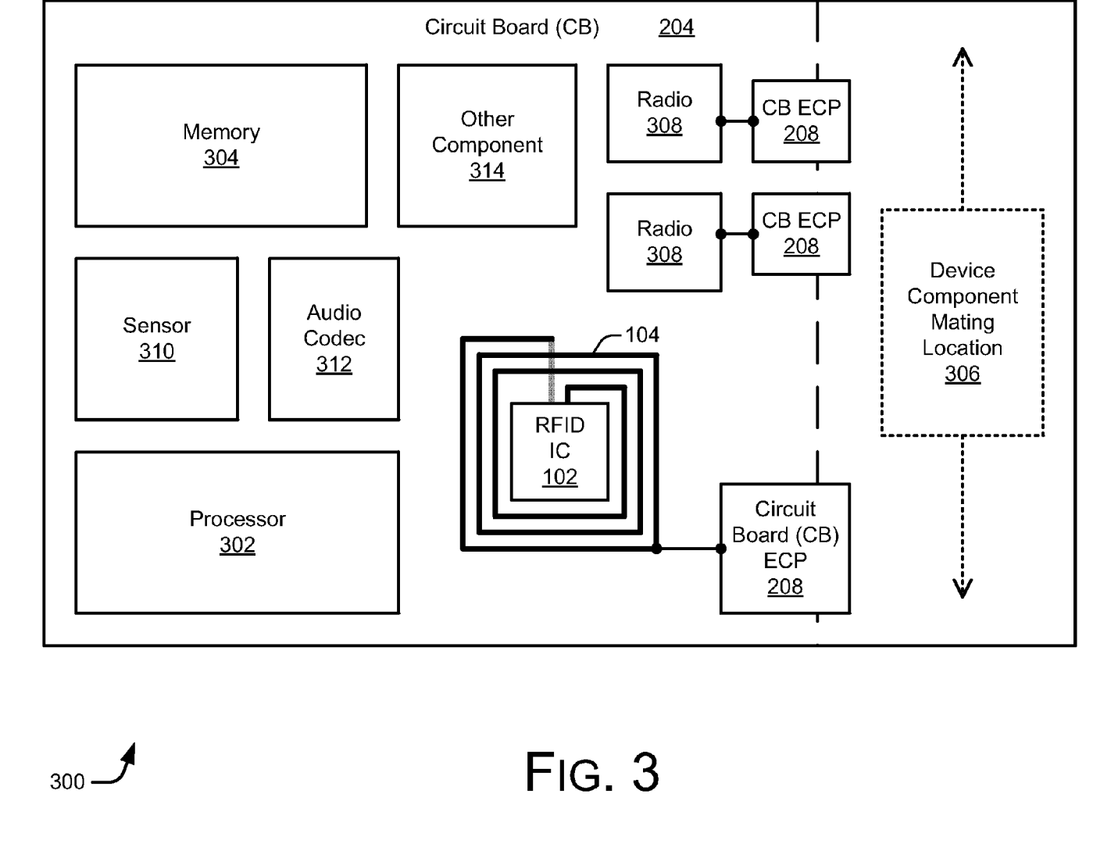
FIG. 3 illustrates an example of a circuit board having circuit board electrical connection parts in accordance with one or more embodiments.

FIG. 3 illustrates at 300 generally an example of a circuit board 204 having multiple circuit board electrical connection parts (ECPs) 208 in accordance with one or more embodiments. The circuit board 204 includes the RFID integrated circuit 102 and the RFID antenna 104, which is coupled to the RFID integrated circuit 102 and illustrated as a coil antenna by way of example. The RFID antenna 104 is also coupled to the lower circuit board ECP 208. As illustrated, the circuit board 204 includes a number of additional circuit devices, such as a processor 302, a memory 304, a sensor 310, an audio codec 312, and so forth, as is known. The circuit board 204 may further include one or more different or alternative components, such as a Global Positioning System (GPS) chip or a video processor, as is indicated by the other component 314.

In one or more embodiments, the circuit board 204 additionally includes multiple radios 308. Examples of radios 308 include a Wi-Fi radio, a BLUETOOTH radio, a cellular service radio—such as for Long Term Evolution (LTE) wireless communication, or some combination thereof. Each radio 308 is coupled to a circuit board ECP 208 located in the upper half of the circuit board 204. Each circuit board ECP 208 may be coupled to a corresponding device component ECP 210 (not shown in FIG. 3) of a device component 206 that is mated to the circuit board 204. A device component mating location 306 is indicated on the illustration of the circuit board 204 in FIG. 3. An example of a device component 206 that can be applied to the device component mating location 306 is shown in FIG. 4.

Figure 4:
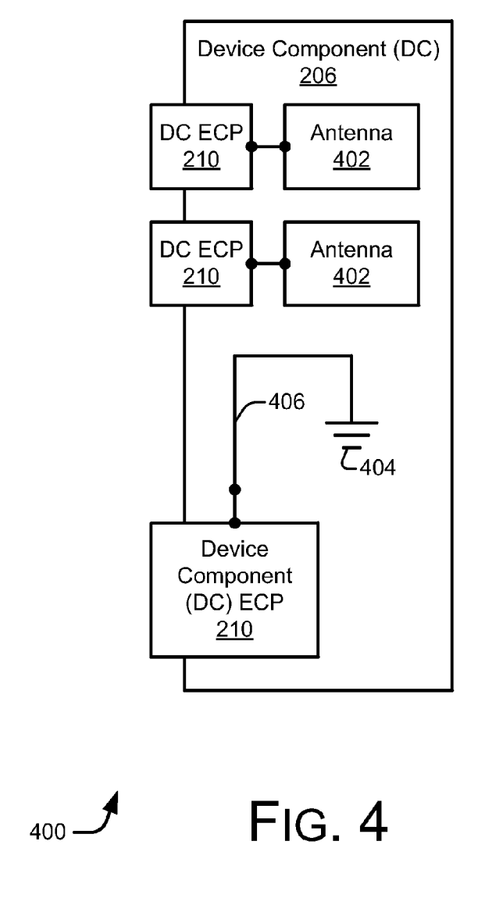
FIG. 4 illustrates an example of a device component having device component electrical connection parts in accordance with one or more embodiments.
Figure 5:
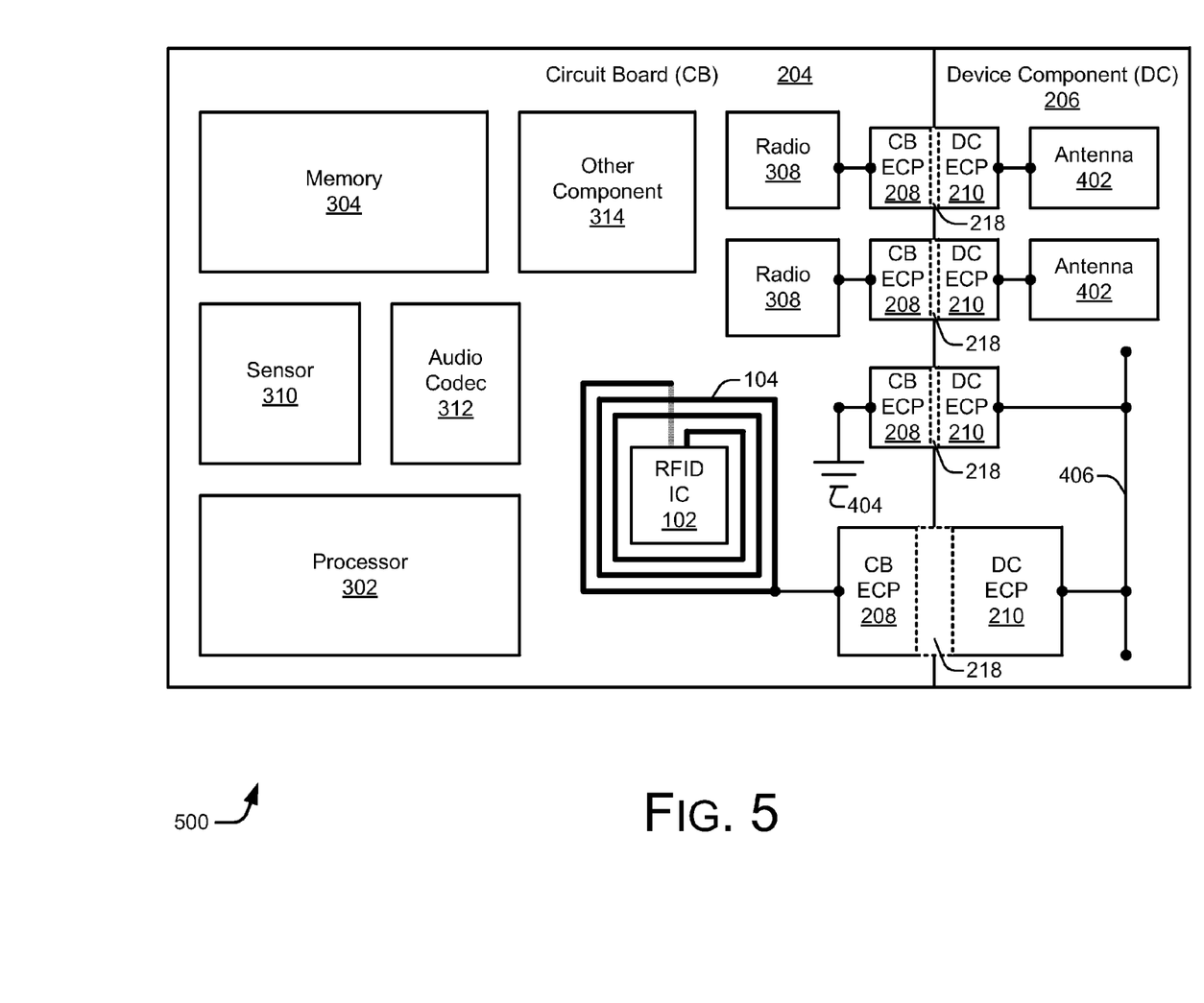
FIG. 5 illustrates a circuit board and a device component that are mated via multiple electrical connection parts in accordance with one or more example embodiments.

FIG. 4 illustrates at 400 generally an example of a device component 206 having multiple device component electrical connection parts (ECPs) 210 in accordance with one or more embodiments. As shown, the device component 206 is implemented as an antenna assembly that includes multiple antennas 402 for a wireless device. However, a device component 206 may include additional or alternative parts. The multiple antennas 402 are respectively coupled to the multiple device component ECPs 210 at the upper portion of the device component 206. At the lower portion of the device component 206, the device component ECP 210 is coupled to a ground 404 via a ground coupling 406. The multiple device component ECPs 210 are respectively coupled to the multiple circuit board ECPs 208 of the circuit board 204 (of FIGS. 2 and 3), as is shown in FIG. 5.

FIG. 5 illustrates at 500 generally a circuit board 204 and a device component 206 that are mated via multiple electrical connection parts 208 and 210, respectively, in accordance with one or more example embodiments. As shown in the upper right of FIG. 5, respective radios 308 of the circuit board 204 are coupled to respective circuit board ECPs 208. Respective antennas 402 of the device component 206 are coupled to respective device component ECPs 210. Respective circuit board ECPs 208 are coupled to respective device component ECPs 210 via respective couplings 218. Thus, a respective radio 308 of the circuit board 204 is coupled to a respective antenna 402 of the device component 206 via a respective pair of electrical connection parts that include a circuit board ECP 208 and a device component ECP 210.

As shown in the lower right of FIG. 5, the RFID integrated circuit 102 is coupled to the RFID antenna 104, which is coupled to a circuit board ECP 208. Moving in a counterclockwise direction around the lower right corner of FIG. 5, the circuit board ECP 208 is coupled to a device component ECP 210 via a coupling 218. The device component ECP 210 is coupled to the grounding coupling 406, which is coupled to another device component ECP 210. The other device component ECP 210 is coupled to another circuit board ECP 208 via another coupling 218. The other circuit board ECP 208 is coupled to the ground 404 on the circuit board 204. In this manner, circuit devices of the device component 206 may be coupled back to the ground 404 of the circuit board 204 or to the ground of the overall device 202 (of FIG. 2) via the ground coupling 406 of the device component 206.

Further, the RFID antenna 104 is coupled to the ground 404 to prevent the RFID integrated circuit 102 from transmitting or receiving signals via the RFID antenna 104. The RFID antenna 104 is coupled to the ground 404 via two pairs of electrical connection parts and the ground coupling 406. The couplings 218 between the two pairs of electrical connection parts are established based on the mating of the device component 206 to the circuit board 204. The mating of the circuit board 204 and the device component 206 therefore effectively removes an operational capability 216 (of FIG. 2) of the RFID integrated circuit 102, namely the capability to transceive wireless signals via the RFID antenna 104. Removal of alternative operational capabilities, as well as additional example details of the RFID integrated circuit 102, is discussed below with reference to FIG. 6.

Figure 6:
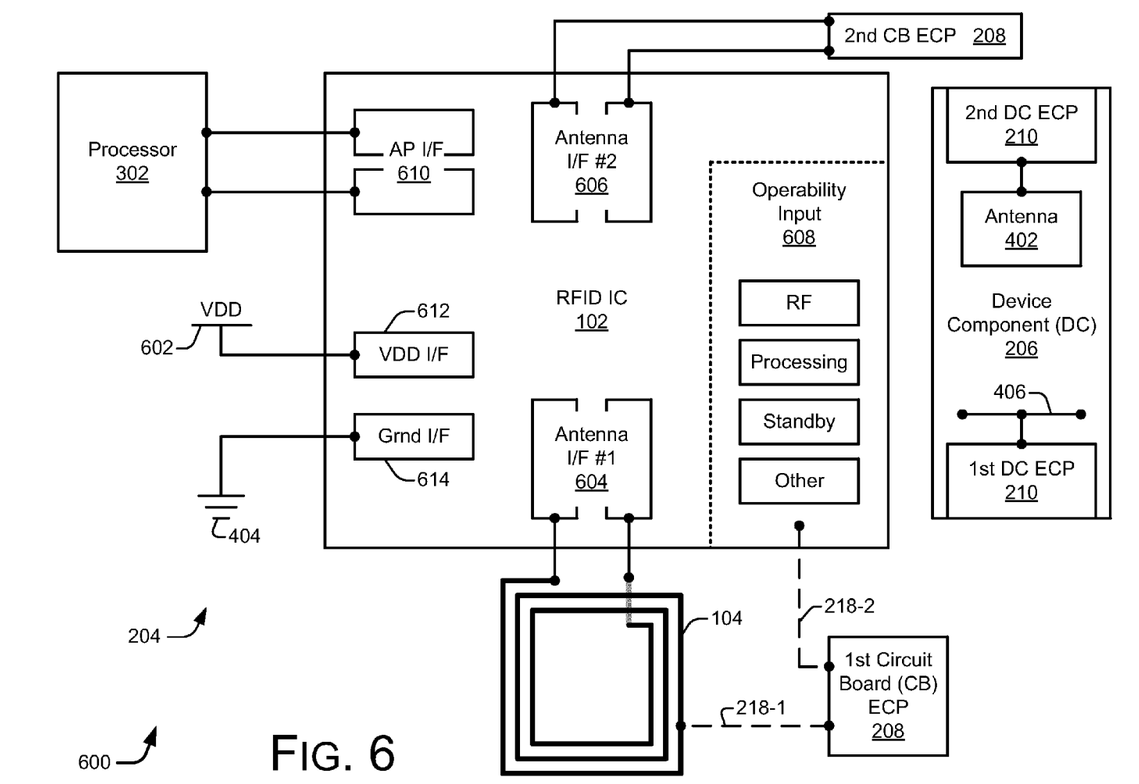
FIG. 6 illustrates a portion of a circuit board having an example of an RFID integrated circuit and a device component in accordance with one or more embodiments.

FIG. 6 illustrates at 600 generally a portion of a circuit board 204 having an example of an RFID integrated circuit 102 and a device component 206 in accordance with one or more embodiments. The portion of the circuit board 204 also includes the processor 302, the RFID antenna 104, a first circuit board ECP 208, a second circuit board ECP 208, the ground 404, and a voltage source (VDD) 602. The RFID integrated circuit 102 includes a number of inputs and interfaces, including a first antenna interface (I/F) 604, a second antenna interface 606, at least one operability input 608, an applications processor (AP) interface 610, a voltage source (VDD) interface 612, and a ground interface 614. Examples of the operability input 608 include an RF input, a processing input, a standby input, another input, or some combination thereof.

As illustrated, the RFID antenna 104 is coupled to the first antenna interface 604. Further, the ground 404 is coupled to the ground interface 614, and the voltage source (VDD) 602 is coupled to the voltage source (VDD) interface 612. The processor 302 is coupled to the applications processor interface 610. The second circuit board ECP 208 is coupled to the second antenna interface 606, and the first circuit board ECP 208 is coupled to the RFID antenna 104. The device component 206 includes a first device component ECP 210, a second device component ECP 210, an antenna 402, and a ground coupling 406. The antenna 402 is coupled to the second device component ECP 210, and the ground coupling 406 is coupled to the first device component ECP 210.

Multiple example implementations are described below with reference to the portion of the circuit board 204 and the device component 206 illustrated in FIG. 6. In one implementation, the first circuit board ECP 208 is coupled to the RFID antenna 104 via an antenna coupling 218-1. Coupling the first circuit board ECP 208 to the first device component ECP 210, based on a mating of the circuit board 204 with the device component 206, grounds the RFID antenna 104 due to the ground coupling 406. The grounding of the RFID antenna 104 removes an operational capability of the RFID integrated circuit 102 because the RFID integrated circuit 102 can no longer transceive wireless signals via the RFID antenna 104 after the grounding. Data stored by the RFID integrated circuit 102 may still be accessible to the processor 302 via, e.g., the applications processor interface 610.

In another implementation, an operational capability can also be added to the RFID integrated circuit 102. For example, the RFID integrated circuit 102 can be provided a capability to transceive wireless signals through a housing of a device, such as the housing 212 of the device 202 (of FIG. 2), using an antenna that is larger than the RFID antenna 104. The antenna 402, for instance, can be a second RFID antenna than is stronger than the RFID antenna 104 for transceiving by the RFID integrated circuit 102. In this implementation, the second device component ECP 210 is coupled to the second circuit board ECP 208 via a coupling (not explicitly shown). After the circuit board 204 is mated with the device component 206, the second RFID antenna implementation of the antenna 402 is coupled to the RFID integrated circuit 102 via the second antenna interface 606. Consequently, the RFID integrated circuit 102 can continue to transceive wireless RFID-related signals after the electronic device is built using the larger second RFID antenna of the device component 206. Alternatively, a different, second RFID integrated circuit (not shown) may be disposed on the circuit board 204 and coupled to an RFID antenna of the device component 206 based on the mating of the circuit board 204 with the device component 206 if the RFID integrated circuit 102 is rendered at least partially inoperable by the mating.

In yet another implementation, instead of the first circuit board ECP 208 being coupled to the RFID antenna 104, the first circuit board ECP 208 is coupled to the at least one operability input 608 of the RFID integrated circuit 102 via an input coupling 218-2. The mating of the circuit board 204 with the device component 206 and the coupling of the first circuit board ECP 208 to the first device component ECP 210 couples the operability input 608 to the ground 404 via the ground coupling 406 (e.g., see FIG. 5). In one example, the operability input 608 is a standby, wake-up, or disable input such that the coupling thereof to the ground 404 removes an operational capability of the RFID integrated circuit 102. Specifically, a capability of the RFID integrated circuit 102 to function can be removed.

In another example, the operability input 608 is an interrupt input that is affected by the grounding. For instance, an RF interrupt implementation of the operability input 608 can cause an operational capability to utilize an antenna interface to be removed from the RFID integrated circuit 102. The at least one operability input 608 may cause both antenna interfaces 604 and 606 to be disabled or may cause a selected one of the two antenna interfaces to be disabled. A processing interrupt implementation of the operability input 608 can cause an operational capability to execute instructions to be removed from the RFID integrated circuit 102.

Other implementations may additionally or alternatively be implemented. For example, an operability input 608 may cause the RFID integrated circuit 102 to cease communicating with the processor 302 via the applications processor interface 610 or to cease communicating on another interface besides that for the processor 302. Assertion of an operability input 608 may also disable execution of certain applications or functionality of the RFID integrated circuit 102 or enable particular applications or functionality of the RFID integrated circuit 102, such as locking or unlocking certain data records or performance of a particular programming module.

The example implementations above are described in a context with active low logic in which an input is asserted by, e.g., being tied to the ground 404. Alternatively, an input may be asserted by, e.g., being tied to the voltage source (VDD) 602 for active high logic. In such a case, mating the circuit board 204 with the device component 206 may cause the operability input 608 to be coupled to the voltage source (VDD) 602 using, for instance, a voltage source coupling (not shown) on the device component 206 that is analogous to the ground coupling 406.

Figure 7:
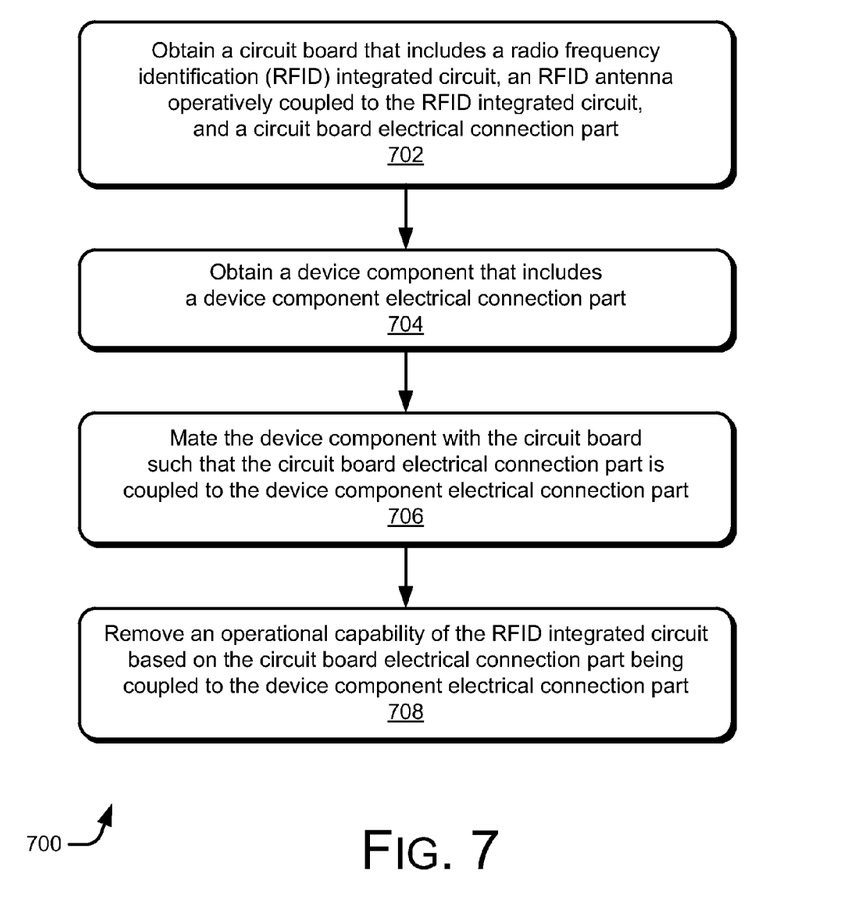
FIG. 7 illustrates an example method for RFID operational capability removal in accordance with one or more embodiments.

FIG. 7 illustrates an example method in a flow diagram 700 that relates to RFID operational capability removal in accordance with one or more embodiments. The order in which the method is shown in FIG. 7 or described herein is not intended to be construed as a limitation, and any number or combination of the described method operations can be performed in any order or with any amount of overlap to perform a method, or an alternate method. For the flow diagram 700, the four operations 702-708 may be performed by a manufacturing entity, such a person or an apparatus or a combination thereof, in a manufacturing environment having manufacturing infrastructure 114.

At block 702, a circuit board is obtained that includes a radio frequency identification (RFID) integrated circuit, an RFID antenna operatively coupled to the RFID integrated circuit, and a circuit board electrical connection part. For example, a manufacturing entity can obtain a circuit board 204 that includes a radio frequency identification (RFID) integrated circuit (IC) 102, an RFID antenna 104 operatively coupled to the RFID integrated circuit 102, and a circuit board electrical connection part (ECP) 208. For instance, a manufacturing entity may fabricate a printed circuit board (PCB) and dispose thereon or attach thereto the RFID integrated circuit 102, a coil implementation of the RFID antenna 104, and the circuit board ECP 208. The circuit board ECP 208 may be coupled to the RFID integrated circuit 102 or the RFID antenna 104.

At block 704, a device component is obtained that includes a device component electrical connection part. For example, a manufacturing entity can obtain a device component 206 that includes a device component electrical connection part (ECP) 210. To do so, an antenna assembly implementation of the circuit board 204 that has multiple antennas 402 for a device 202 may be fabricated so as to include the device component ECP 210.

At block 706, the device component is mated with the circuit board such that the circuit board electrical connection part is coupled to the device component electrical connection part. For example, the manufacturing entity can mate the device component 206 with the circuit board 204 such that the circuit board ECP 208 is coupled to the device component ECP 210 via a coupling 218. To effectuate the mating, the device component 206 may be placed over the circuit board 204 and jointly screwed onto a front portion of the housing 212.

At block 708, an operational capability of the RFID integrated circuit is removed based on the circuit board electrical connection part being coupled to the device component electrical connection part. For example, the manufacturing entity can remove an operational capability 216 of the RFID integrated circuit 102 based on the circuit board ECP 208 being coupled to the device component ECP 210 via the coupling 218. For instance, creation of the coupling 218 as a result of the mating of the circuit board 204 with the device component 206 may place the RFID integrated circuit 102 in a condition or state in which an operational capability 216 that was previously available or would have previously been available is no longer available at least partially due to the coupling of the circuit board ECP 208 to the device component ECP 210. The coupling 218 may tie the RFID antenna 104 or an operability input 608 of the RFID integrated circuit 102 to a ground or supply voltage level.

Figure 8:
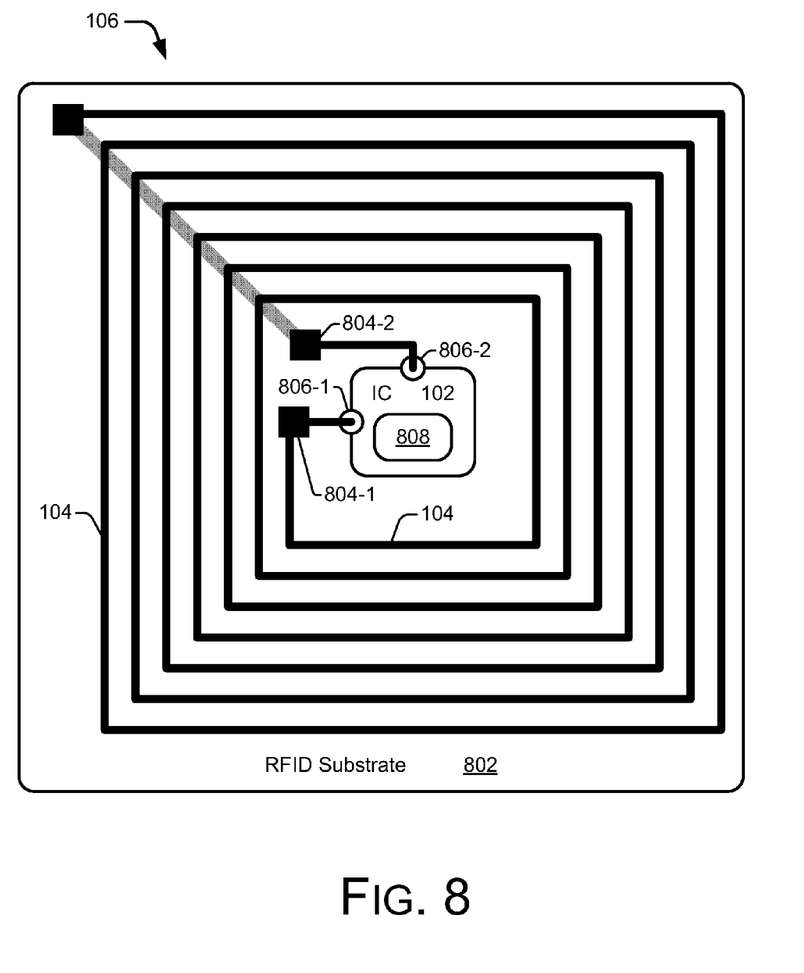
FIG. 8 illustrates an example RFID tag that is referenced to describe certain RFID principles that may be implemented in embodiments of RFID operational capability removal.

FIG. 8 illustrates an example RFID tag 106 which is referenced to describe certain RFID principles that may be applied in embodiments of RFID operational capability removal. For example embodiments, the RFID tag 106 may include an RFID substrate 802. Examples of substances for the RFID substrate 802 include paper, plastic (e.g., flexible or rigid), wood, glass, ceramic, printed circuit board (PCB) or a circuit board generally, a flooring material, or some combination thereof. The RFID substrate 802 may form a backbone or a foundation or a framework of a supporting structure for the RFID tag 106. Alternatively, the RFID substrate 802 may be attached to, encapsulated within, incorporated as part of, etc. a backbone or a foundation or a framework of a supporting structure for the RFID tag 106.

As illustrated in the example schematic diagram of FIG. 8, the RFID substrate 802 includes or at least supports an IC 102 and an antenna 104. The IC 102 includes two antenna terminals 806: a first antenna terminal 806-1 and a second antenna terminal 806-2. The antenna 104 includes two antenna ends 804: a first antenna end 804-1 and a second antenna end 804-2. Note that the part of the antenna 104 that is located at the top left corner of the RFID substrate 802 may alternatively or additionally be considered a second antenna end 804-2 (but such additional reference number is not illustrated). One of the first antenna end 804-1 or the second antenna end 804-2 may be considered a so-called antenna loop in, and the other may be considered a so-called antenna loop out. The first antenna terminal 806-1 of the IC 102 is coupled to the first antenna end 804-1 of the antenna 104, and the second antenna terminal 806-2 of the IC 102 is coupled to the second antenna end 804-2 of the antenna 104. The antenna 104 enables the IC 102 to receive or send wireless signals for the RFID tag 106.

The IC 102 may be implemented using any of one or more processors (e.g., a microprocessor, a controller, a computing core, or a combination thereof) or processing systems with storage memory having processor-executable instructions that are fixed, hardware-encoded, programmable, alterable, wirelessly-receivable, or a combination thereof. The IC 102 may be realized, by way of example but not limitation, as an application-specific integrated circuit (ASIC), a field-programmable gate array (FPGA), a complex programmable logic device (CPLD), an application-specific standard product (ASSP), a system on-a-chip (SoC), a silicon-based processing unit, or some combination thereof. Generally, an integrated circuit can be realized with hardware along with one or more of software, firmware, or fixed logic circuitry that is implemented in connection with processing or control circuits.

The RFID tag 106 may further include processor-accessible storage memory 808. The storage memory 808 can be integrated with the IC 102 (as shown) or separate from the IC 102. The storage memory 808 enables persistent storage of data or processor-executable instructions (e.g., software applications, programs, functions, hard-coded operations, or a combination thereof). The storage memory 808 can include various implementations of random access memory (RAM), read only memory (ROM), flash memory, or other types of storage media in various memory device configurations. Although not specifically indicated in FIG. 8, the RFID tag 106 may further include an interconnect (e.g., a bus or other data transfer mechanism with traces, wires, buffers, etc.) that couples components of the RFID tag 106 to each other. Although not depicted in FIG. 8, the RFID tag 106 may also include a power source, such as a non-rechargeable battery, a battery that is rechargeable by wire or wirelessly, a capacitor, a combination thereof, and so forth.

RFID tags may be produced in many different shapes, sizes, form factors, and materials. For example, RFID tags may be flat (i.e., two-dimensional) or three-dimensional (e.g., having an appreciable depth in addition to height and width). RFID tags may be square, rectangular, circular, triangular, box-shaped, spherical, cylindrical, and so forth. Furthermore, RFID tags may be, for instance, at least as small as a grain of rice or at least as big as several inches across. An RFID substrate of an RFID tag may be secured to another object, such as a frame of an electronic device; may be incorporated into another object, such as a circuit board for an electronic device; may be adhered to another object, such as a housing of an electronic device; and so forth. Additionally, an RFID tag may be enclosed within or encapsulated by another material or object, may be part of another circuit device, may be exposed or visible, some combination thereof, and so forth.

Figure 9:
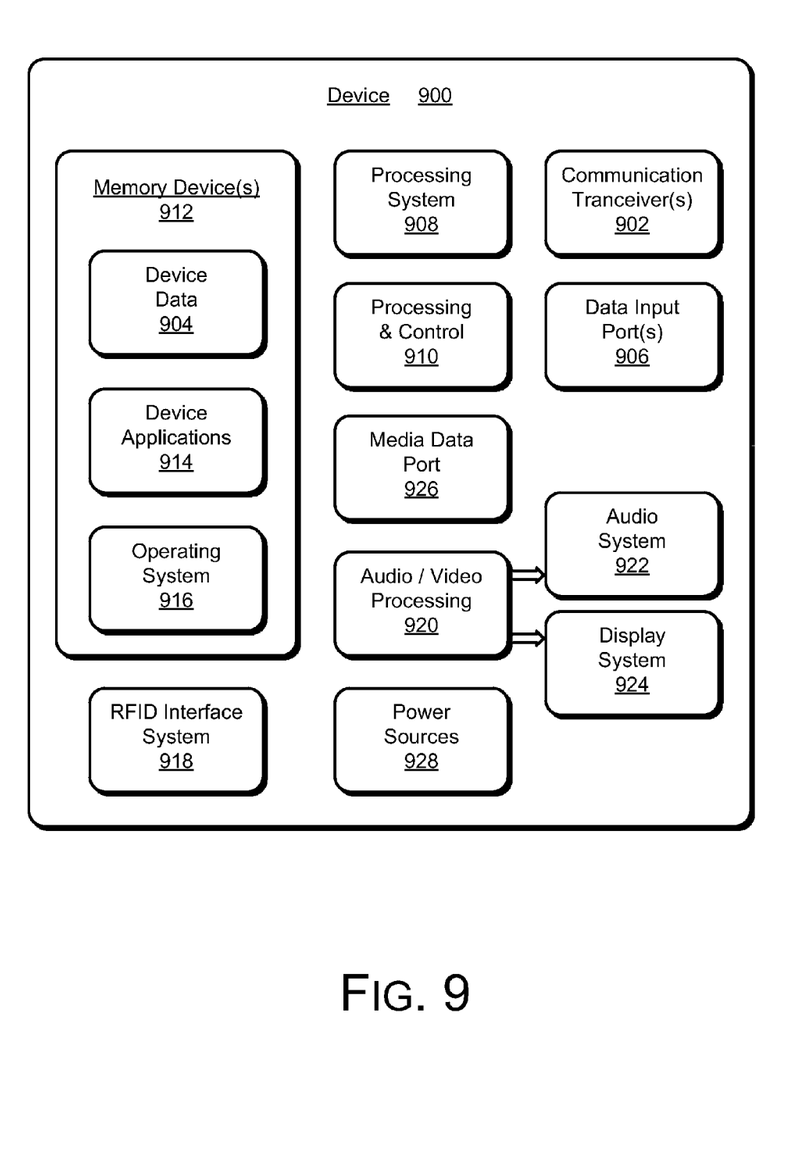
FIG. 9 illustrates various components of an example device that can implement embodiments of RFID operational capability removal.

FIG. 9 illustrates various components of an example device 900 in which embodiments of RFID operational capability removal can be implemented. The example device 900 can be implemented as any electronic or computing device described herein that includes at least an RFID integrated circuit or antenna, such as any type of client, mobile phone, tablet, computing, communication, entertainment, gaming, media playback, appliance, and/or other type of device. For example, the device 202 that is shown in FIG. 2 may be implemented as the example device 900.

The device 900 includes one or more communication transceivers 902 that enable wired and/or wireless communication of device data 904 with other devices. The device data 904 can include any type of audio, video, and/or image data, as well as RFID, performance, or diagnostic-related data. Example transceivers 902 include wireless personal area network (WPAN) radios compliant with various IEEE 802.15 (Bluetooth™) standards, wireless local area network (WLAN) radios compliant with any of the various IEEE 802.11 (Wi-Fi™) standards, wireless wide area network (WWAN) radios for cellular phone communication, wireless metropolitan area network (WMAN) radios compliant with various IEEE 802.15 (WiMAX™) standards, wired local area network (LAN) Ethernet transceivers for network data communication, and RFID-related transceivers for interfacing with an internal or external RFID tag.

The device 900 may also include one or more data input ports 906 via which any type of data, media content, and/or inputs can be received, such as user selectable inputs to the device, messages, music, television content, recorded content, positional indicators, and any other type of audio, video, and/or image data received from any content and/or data source. The data input ports 906 may include USB ports, coaxial cable ports, and other serial or parallel connectors (including internal connectors) for flash memory, DVDs, CDs, and the like. The data input ports 906 may be used to couple the device to any type of components, peripherals, or accessories such as microphones and/or cameras.

The device 900 includes a processing system 908 of one or more processors (e.g., any of microprocessors, controllers, and the like) and/or a processor and memory system implemented as a system-on-chip (SoC) that processes computer-executable instructions. The processing system 908 may be implemented at least partially in hardware, which can include components of an integrated circuit (IC) or on-chip system, an application-specific integrated circuit (ASIC), a field-programmable gate array (FPGA), a complex programmable logic device (CPLD), and other implementations in silicon and/or other hardware. Alternatively or in addition, the device can be implemented with any one or combination of software, hardware, firmware, or fixed logic circuitry that is implemented in connection with processing and control circuits, which are generally identified at 910. The device 900 may further include any type of a system bus or other data and command transfer system (not explicitly shown) that couples the various components within the device. A system bus can include any one or combination of different bus structures and architectures, as well as control and data lines.

The device 900 also includes computer-readable storage memory 912, which is illustrated as one or more memory devices 912, that enable data storage, such as data storage devices that can be accessed by a computing device, and that provide persistent storage of data and executable instructions (e.g., software applications, programs, functions, and the like). Examples of the computer-readable storage memory 912 include volatile memory and non-volatile memory, fixed and removable media devices, and any suitable memory device or electronic data storage that maintains data for computing device access. The computer-readable storage memory 912 can include various implementations of random access memory (RAM), read-only memory (ROM), flash memory, and other types of storage media in various memory device configurations. The device 900 may also include a mass storage media device.

The computer-readable storage memory 912 provides data storage mechanisms to store the device data 904, other types of information and/or data, and various device applications 914 (e.g., software applications). For example, an operating system 916 can be maintained as software instructions with a memory device and executed by the processing system 908. The device applications 914 may also include a device manager, such as any form of a control application, software application, signal-processing and control module, code that is native to a particular device, a hardware abstraction layer for a particular device, and so on. In this example, the device 900 includes an RFID interface system 918 that implements, or facilitates implementation of, embodiments of RFID operational capability removal, and that may be realized with hardware components and/or in software. Examples of the RFID interface system 918 include an RFID integrated circuit 102, an RFID antenna 104, an RFID tag 106, a coupling or linkage or bus mechanism to an RFID tag 106 or a part thereof, or a combination thereof.

The device 900 also includes an audio and/or video processing system 920 that generates audio data for an audio system 922 and/or generates display data for a display system 924. The audio system 922 and/or the display system 924 may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as a media data port 926. In implementations, the audio system 922 and/or the display system 924 are integrated components of the example device. Alternatively, the audio system 922 and/or the display system 924 are external, peripheral components of the example device.

The device 900 can also include one or more power sources 928, such as when the device is implemented as a mobile device. The power sources 928 may include a charging and/or power system, and can be implemented as a flexible strip battery, a rechargeable battery, a charged super-capacitor, and/or any other type of active or passive power source. With regard to terminology, unless context dictates otherwise, use herein of the word "or" may be considered use of an "inclusive or," or a term that permits inclusion or application of one or more items that are linked by the word "or" (e.g., a phrase "A or B" may be interpreted as permitting just "A," permitting just "B," or permitting both "A" and "B").

Although embodiments of RFID operational capability removal have been described in language specific to features and/or methods, the subject of the appended claims is not necessarily limited to the specific features or methods described. Rather, the specific features and methods are disclosed as example implementations of RFID operational capability removal, and other equivalent features and methods are intended to be within the scope of the appended claims. Further, various different embodiments are described and it is to be appreciated that each described embodiment can be implemented independently or in connection with one or more other described embodiments.

The invention claimed is:
1. An article of manufacture, comprising:
a circuit board including:
  a radio frequency identification (RFID) integrated circuit having a first antenna interface and a second antenna interface, the RFID integrated circuit configured to process wireless signals received via the first antenna interface or the second antenna interface;
  a first antenna that is coupled to the first antenna interface, the RFID integrated circuit configured to communicate via the first antenna if the first antenna is not grounded;
  a first circuit board electrical connection part coupled to the first antenna; and
  a second circuit board electrical connection part coupled to the second antenna interface of the RFID integrated circuit; and
a device component mated with the circuit board, the device component including:
  a first device component electrical connection part coupled to the first circuit board electrical connection part so as to ground the first antenna;
  a second device component electrical connection part coupled to the second circuit board electrical connection part; and
  a second antenna coupled to the second device component electrical connection part, the second antenna further coupled to the second antenna interface of the RFID integrated circuit via the second device component electrical connection part and the second circuit board electrical connection part, wherein the RFID integrated circuit is configured to communicate via the second antenna if the device component is mated with the circuit board.

2. The article of manufacture as recited in claim 1, wherein:
the circuit board further includes a processor coupled to the RFID integrated circuit; and
the circuit board is configured to provide access to the processor through the RFID integrated circuit via the first antenna of the circuit board prior to the device component being mated with the circuit board and via the second antenna of the device component after the device component is mated with the circuit board.

3. The article of manufacture as recited in claim 1, wherein:
the first circuit board electrical connection part, the second circuit board electrical connection part, the first device component electrical connection part, and the second device component electrical connection part each comprises at least one of a metal contact, a trace, a wire pattern, a switch, a clip, a snap connector, a click connector, a screw, a pad, a friction connector, or a conductive area.

4. The article of manufacture as recited in claim 1, wherein:
the first antenna corresponds to a first antenna size, and the second antenna corresponds to a second antenna size; and
the first antenna size is smaller than the second antenna size.

5. The article of manufacture as recited in claim 1, wherein the RFID integrated circuit is rendered incapable of receiving a wireless signal via the first antenna and capable of receiving a wireless signal via the second antenna based on the device component being mated with the circuit board.

6. The article of manufacture as recited in claim 1, wherein the device component comprises:
a third antenna to accommodate multiple radios of a device.

7. The article of manufacture as recited in claim 1, further comprising:
a chassis that facilitates the device component being mated with the circuit board.

8. A method for building a device, the method comprising:
obtaining a circuit board that includes a radio frequency identification (RFID) integrated circuit, an RFID antenna operatively coupled to the RFID integrated circuit, and a circuit board electrical connection part;
obtaining a device component that includes a device component electrical connection part and another RFID antenna;
mating the device component with the circuit board such that the circuit board electrical connection part is coupled to the device component electrical connection part, including coupling the other RFID antenna to an antenna interface of the RFID integrated circuit;
removing an operational capability of the RFID integrated circuit based on the circuit board electrical connection part being coupled to the device component electrical connection part;
prior to said mating, communicating with the RFID integrated circuit via the RFID antenna; and
after said removing, communicating with the RFID integrated circuit via the other RFID antenna.

9. The method as recited in claim 8, wherein said mating comprises:
securing the device component to the circuit board.

10. The method as recited in claim 8, wherein said mating comprises:
securing the device component and the circuit board to a common chassis.

11. The method as recited in claim 8, wherein:
the RFID integrated circuit includes an operability input;
the circuit board further includes another circuit board electrical connection part, the other circuit board electrical connection part i-s-coupled to the operability input; and
the method further comprises:
disabling an intrinsic operational capability of the RFID integrated circuit using the operability input and the other circuit board electrical connection part.

12. The method as recited in claim 11, wherein:
the intrinsic operational capability comprises a capability of the RFID integrated circuit to process received wireless signals; and
said disabling comprises deactivating the capability of the RFID integrated circuit to process received wireless signals.

13. The method as recited in claim 12, wherein:
the circuit board further includes an application processor; and
the method further comprises, while the capability of the RFID integrated circuit to process received wireless signals is deactivated, accessing the RFID integrated circuit with the application processor.

14. The method as recited in claim 8, wherein:
the circuit board electrical connection part is coupled to the RFID antenna;
said mating comprises grounding the RFID antenna responsive to a coupling of the circuit board electrical connection part to the device component electrical connection part; and
said removing comprises disabling an extrinsic operational capability of the RFID integrated circuit based on the grounding of the RFID antenna, the extrinsic operational capability comprising a capability of the RFID integrated circuit to receive a wireless signal via the RFID antenna.

15. The method as recited in claim 8, further comprising:
enclosing the circuit board and the device component in a housing to assemble the device.

16. A device comprising:
a circuit board including:
a radio frequency identification (RFID) integrated circuit including a first antenna interface and a second antenna interface;
a first RFID antenna operatively coupled to the first antenna interface of the RFID integrated circuit, the first RFID antenna corresponding to a first antenna size; and
a circuit board electrical connection part;
a device component including:
a device component electrical connection part; and
a second RFID antenna, the second RFID antenna corresponding to a second antenna size, the second antenna size being larger than the first antenna size; and
an electromechanical coupling between the circuit board electrical connection part and the device component electrical connection part, including a physical coupling of the second RFID antenna to the second antenna interface of the RFID integrated circuit, the electromechanical coupling configured to remove a capability of the RFID integrated circuit to communicate via the first RFID antenna of the circuit board and to enable the RFID integrated circuit to communicate via the second RFID antenna of the device component.

17. The device as recited in claim 16, wherein:
the capability of the RFID integrated circuit to communicate via the first RFID antenna comprises a capability to receive or transmit a wireless signal via the first RFID antenna; and
the electromechanical coupling is further configured to remove the capability to receive or transmit the wireless signal via the first RFID antenna.

18. The device as recited in claim 16, wherein the electromechanical coupling is further configured to remove the capability of the RFID integrated circuit to communicate via the first RFID antenna by coupling the first RFID antenna to ground.

19. The device as recited in claim 16, wherein the electromechanical coupling is further configured to remove the capability of the RFID integrated circuit to communicate via the first RFID antenna by coupling the first RFID antenna to a supply voltage.

20. The device as recited in claim 16, wherein:
the RFID integrated circuit includes an operability input; and
the electromechanical coupling is further configured to remove the capability of the RFID integrated circuit to communicate via the first RFID antenna by asserting the operability input of the RFID integrated circuit.

* * * * *